US007387529B2

(12) United States Patent
Chan

(10) Patent No.: US 7,387,529 B2
(45) Date of Patent: Jun. 17, 2008

(54) INTEGRATED CONNECTOR FOR POWERLINE NETWORK AND POWER SUPPLY

(75) Inventor: Tat Keung Chan, South San Francisco, CA (US)

(73) Assignee: Asoka USA Corporation, Foster City, CA (US)

( * ) Notice: Subject to any disclaimer, the term of this patent is extended or adjusted under 35 U.S.C. 154(b) by 0 days.

(21) Appl. No.: 11/417,786

(22) Filed: May 3, 2006

(65) Prior Publication Data

US 2006/0199427 A1 Sep. 7, 2006

Related U.S. Application Data

(62) Division of application No. 11/056,819, filed on Feb. 10, 2005.

(60) Provisional application No. 60/554,691, filed on Mar. 19, 2004.

(51) Int. Cl.
*H01R 11/00* (2006.01)
(52) U.S. Cl. .................................................. 439/505
(58) Field of Classification Search ................ 439/505, 439/502, 501, 500, 535, 536, 650; 361/679, 361/681, 11; 363/144, 146, 683, 81
See application file for complete search history.

(56) References Cited

U.S. PATENT DOCUMENTS 5,805,053 A * 9/1998 Patel et al. ............ 340/310.11
5,906,506 A * 5/1999 Chang et al. ................ 439/500
6,007,372 A * 12/1999 Wood .......................... 439/502
6,130,896 A 10/2000 Lueker et al.
6,188,557 B1 2/2001 Chaudhry
6,243,413 B1 6/2001 Beukema
6,307,764 B1 * 10/2001 Peek et al. ................... 363/125
6,388,564 B1 5/2002 Piercy et al.
6,522,626 B1 * 2/2003 Greenwood ................. 370/208
6,560,319 B1 5/2003 Binder
6,597,557 B2 * 7/2003 Hunter ........................ 361/118

(Continued)

FOREIGN PATENT DOCUMENTS

DE 100 08602 A1 6/2001

(Continued)

OTHER PUBLICATIONS

Evans; "The CEBus Standard User's Guide, The Training Department Publications, May 1996."

*Primary Examiner*—Alexander Gilman
(74) *Attorney, Agent, or Firm*—Townsend and Townsend and Crew, LLP

(57) ABSTRACT

A portable connector for power line networking. The connector includes a single AC connector, which has at least a first prong and a second prong (which will be plugged into a conventional connector device). The connector also has at least a first pair of wires coupled to the single AC connector. The first pair of wires includes a first wire coupled to the first prong and a second wire coupled to the second prong. A hardware module is coupled to the first pair of wires, which are adapted to transmit a plurality of AC signals corresponding to AC power from the AC connector and a plurality data signals from the AC connector. A single DC connector is coupled to the hardware module. A single network connector is also coupled to the hardware module.

15 Claims, 5 Drawing Sheets

U.S. PATENT DOCUMENTS

| | | |
|---|---|---|
| 6,668,058 B2 | 12/2003 | Grimes |
| 6,747,859 B2 * | 6/2004 | Walbeck et al. ............ 361/93.1 |
| 6,757,368 B2 | 6/2004 | Binder |
| 6,759,946 B2 | 7/2004 | Sahinoglu et al. |
| 6,775,121 B1 | 8/2004 | Chaudhry |
| 6,842,459 B1 | 1/2005 | Binder |
| 6,867,689 B2 * | 3/2005 | Yokoo ........................ 375/222 |
| 6,885,674 B2 | 4/2005 | Hunt et al. |
| 6,904,134 B2 * | 6/2005 | Jeon et al. ............... 379/93.07 |
| 6,909,943 B2 * | 6/2005 | Lehr et al. .................. 700/286 |
| 6,927,340 B1 | 8/2005 | Binder et al. |
| 6,934,170 B2 * | 8/2005 | Ooishi ........................ 363/146 |
| 6,947,409 B2 | 9/2005 | Iwamura |
| 6,956,464 B2 * | 10/2005 | Wang et al. ................. 375/258 |
| 6,958,680 B2 | 10/2005 | Kline |
| 6,965,302 B2 | 11/2005 | Mollenkopf et al. |
| 7,007,305 B2 | 2/2006 | Carson et al. |
| 7,019,954 B2 * | 3/2006 | Manning et al. ............ 361/111 |
| 7,136,936 B2 | 11/2006 | Chan et al. |
| 2002/0014972 A1 | 2/2002 | Danielson et al. |
| 2003/0185027 A1 * | 10/2003 | Yokoo et al. ................. 363/81 |
| 2004/0001440 A1 | 1/2004 | Kostoff, II et al. |
| 2004/0125870 A1 * | 7/2004 | Yamazaki .................... 375/222 |
| 2004/0171296 A1 * | 9/2004 | Chen ......................... 439/502 |

FOREIGN PATENT DOCUMENTS

| | | |
|---|---|---|
| DE | 100 12235 C2 | 12/2001 |
| DE | 100 47648 A1 | 4/2002 |
| DE | 101 0353 A1 | 8/2002 |
| DE | 100 59564 A1 | 9/2002 |
| DE | 101 19039 A1 | 12/2002 |
| DE | 10119040 A1 | 12/2002 |
| DE | 100 42958 C2 | 1/2003 |
| EP | 0 822 721 A2 | 2/1998 |
| EP | 1 043 866 A2 | 10/2000 |
| EP | 1 251 646 A2 | 10/2002 |
| WO | WO 01/63787 A1 | 8/2001 |
| WO | WO 02/37712 A1 | 5/2002 |

* cited by examiner

INTEGRATED CONNECTOR FOR POWERLINE NETWORK AND POWER SUPPLY

CROSS-REFERENCES TO RELATED APPLICATIONS

This application is a divisional application which claims benefit to U.S. application Ser. No. 11/056,819, filed on Feb. 10, 2005 which claims priority to Provisional Application No. 60/554,691, filed on Mar. 19, 2004, and is incorporated herein by reference.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The present invention relates generally to power line networking techniques. More particularly, the invention provides a method and apparatus for connecting a client device to a powerline for network communications and power. Merely by way of example, the invention has been applied to an Ethernet network connection for portable computing environments (e.g., a personal computer, a personal computing device, a cellular phone, a personal digital assistant, and a digital camera) but it would be recognized that other applications exist.

Telecommunication techniques have been around for numerous years. In the early days, a communication technique known as telegraph was developed. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network or other communication network. These computers or workstations coupled to each other can transmit many types of information from one geographical location to another geographical location. In general, there have been various types of computer networks, including local area networks, commonly called LANs, and wide are networks, commonly called WANs.

Local area networks have been used to connect computers in a smaller geographic region than wide area networks. Most local area networks rely upon dedicated cables to transmit the communication signals through the network. An alternative way of transmitting such communication signals through non-dedicated cables but through a power supply network is referred to as Powerline Communication, commonly called PLC. Powerline communication relies upon pre-existing powerlines that are used to supply electrical power distributed through buildings, such as homes and office structures. Conventional PLC relies upon radio frequency technologies. Although powerline communications have been successful in part, many limitations still exist.

From the above, it is seen that improved techniques for powerline networks are highly desired.

BRIEF SUMMARY OF THE INVENTION

According to the present invention, techniques for power line networking techniques are provided. More particularly, the invention provides a method and apparatus for connecting a client device to a powerline for network communications and power. Merely by way of example, the invention has been applied to an Ethernet network connection for portable computing environments (e.g., a personal computer, a personal computing device, a cellular phone, a personal digital assistant, and a digital camera) but it would be recognized that other applications exist.

In a specific embodiment, the invention provides a portable connector for power line networking. The connector includes a single AC connector, which has at least a first prong and a second prong (which will be plugged into a conventional connector device), e.g., AC Plug. The connector also has at least a first pair of wires coupled to the single AC connector. The first pair of wires includes a first wire coupled to the first prong and a second wire coupled to the second prong. A hardware module is coupled to the first pair of wires, which are adapted to transmit a plurality of AC signals corresponding to AC power from the AC connector and a plurality data signals from the AC connector. A single DC connector is coupled to the hardware module. A single network connector is also coupled to the hardware module.

In a preferred embodiment, the hardware module comprises a switching power supply, which is coupled between the single AC connector and single DC connector. The switching power supply is adapted to convert AC signals from the single AC connector into direct current for use at the DC connector. The module also has a powerline module coupled between the single AC connector and single network connection. The powerline module is adapted to convert the plurality of data signals in a first format to a plurality of data signals in a second format for use at the single network connection.

In an alternative specific embodiment, the present invention a portable powerline connector for remote applications, e.g., lap top, a personal computer, a personal computing device, a cellular phone, a personal digital assistant, MP-3 player (or other audio player) and a digital camera. The connector has a single AC connector, which includes at least a first prong and a second prong. The single AC connector is adapted to be plugged into a powerline enabled socket, which has at least a first receptacle for the first prong and a second receptacle for the second prong. The connector has at least a first pair of wires coupled to the single AC connector. The first pair of wires includes a first wire coupled to the first prong and a second wire coupled to the second prong. An insulating material (e.g., high density polyethylene) houses the first pair of wires. A hardware module is coupled to the first pair of wires. The first pair of wires is adapted to transmit a plurality of AC signals corresponding to AC power from the AC connector and a plurality data signals from the AC connector. A powerline module is operably coupled to the hardware module. The powerline module is adapted to convert the plurality of data signals in a first format to a plurality of data signals in a second format. A power supply is operably coupled to the hardware module. The power supply is adapted to convert the plurality of AC signals (e.g., 100-120 volts, 240 volts) into a DC signal, e.g., direct current, e.g., 5 to 20 Volts DC 2-10 Amperes. A DC connector is coupled to the hardware module. The DC connector is coupled to the DC signal. A network connector is coupled to the hardware module. The network connector is coupled to the powerline module.

Numerous benefits are achieved using the present invention over conventional techniques. The present invention can be applied using conventional components from computer networking and hardware technologies. Additionally, the invention can be applied to pre-existing powerline structures without substantial modification. Preferably, the present system and method are easy to implement and also selectively connect and depending upon the user. In preferred embodiments, the invention also provides an apparatus and method for portable computing and the like. In preferred embodiment, the connector can be provided in a hand carry bag or in a pocket of a user of the remote application. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for power line networking techniques are provided. More particularly, the invention provides a method and apparatus for connecting a client device to a powerline for network communications and power. Merely by way of example, the invention has been applied to an Ethernet network connection for portable computing environments (e.g., a personal computer, a personal computing device, a cellular phone, a personal digital assistant, and a digital camera) but it would be recognized that other applications exist.

Figure 1:
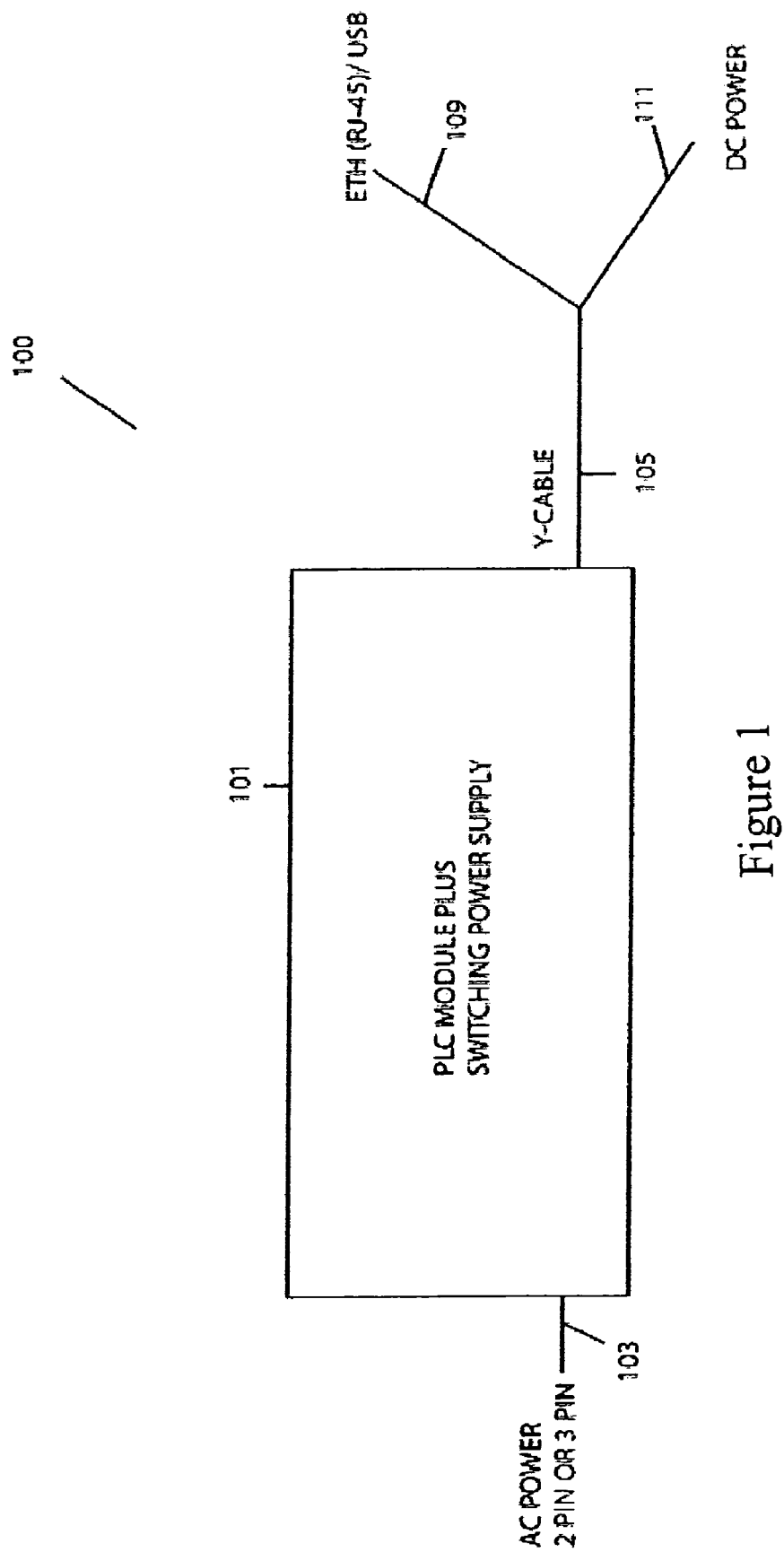
FIG. 1 is a simplified diagram of a powerline connector according to an embodiment of the present invention.

FIG. 1 is a simplified diagram of a powerline connector according to an embodiment of the present invention. This diagram is merely an example, which should not unduly limit the scope of the claims herein. One of ordinary skill in the art would recognize other variations, modifications, and alternatives. As shown, a portable connector 100 for power line networking is shown. The connector includes a single AC connector 103, which has at least a first prong and a second prong (which will be plugged into a conventional connector device). The connector also has at least a first pair of wires coupled to the single AC connector. The first pair of wires includes a first wire coupled to the first prong and a second wire coupled to the second prong. A hardware module 101 is coupled to the first pair of wires, which are adapted to transmit a plurality of AC signals corresponding to AC power from the AC connector and a plurality data signals from the AC connector. Preferably, the hardware module is a powerline communication module, which will be described in further detail below. A single DC connector 111 is coupled to the hardware module. A single network connector 109 is also coupled to the hardware module.

In a specific embodiment, the first prong and the second prong can be any suitable electrical connections for home, office, or business use. As merely an example, such prongs are often called AC Plug, but can also include other variations. As an alternative example, depending upon the particular country, the prongs can also be 3-pin plug and the like. The prongs are coupled to the module via power line wiring Of course, one of ordinary skill in the art would recognize many variations, alternatives, and variations.

In a specific embodiment of use in the United States of America, the wires are often 12 or 14 gauge each. Although other gauges such as 16 and at least 18 may also be used. The length of such wires is also about 4 ft and often no greater than about 6 ft depending upon the embodiment. The wires are often moisture resistant, durable, and resistant to general environmental conditions. A plastic coating and insulating are often provided surrounding the connective portions of the wires in preferred embodiments.

In a specific embodiment, the connector also includes other wires, which include DC 111 and networking wires 109, extend from the hardware module, which will be described in more detail below. The DC wires is often 18 AWG. The networking wires is often 24 AWG, although others can also be used. The wires are often moisture resistant, durable, and resistant to general environmental conditions. A plastic coating and insulating are often provided surrounding the connective portions of the wires in preferred embodiments.

In a preferred embodiment, the wires, including network and DC, are bundled together 105 and extend out in the "Y-shaped" configuration, which is illustrated by FIG. 1. As merely an example, the network connector can be any suitable type such as Ethernet (Cat 5) (RF-45), Universal Serial Bus, commonly called USB, mini-USB, or others. As shown, the DC connection is provided to the portable computing device and the network connector is also provided to the portable computing device, which is the same computing device, according to a specific embodiment. Powerline includes powerline communication signals and power to supply energy to the computing device according to a specific embodiment. Further details of alternative embodiments of the present invention can be found throughout the present specification and more particularly below.

Figure 2:
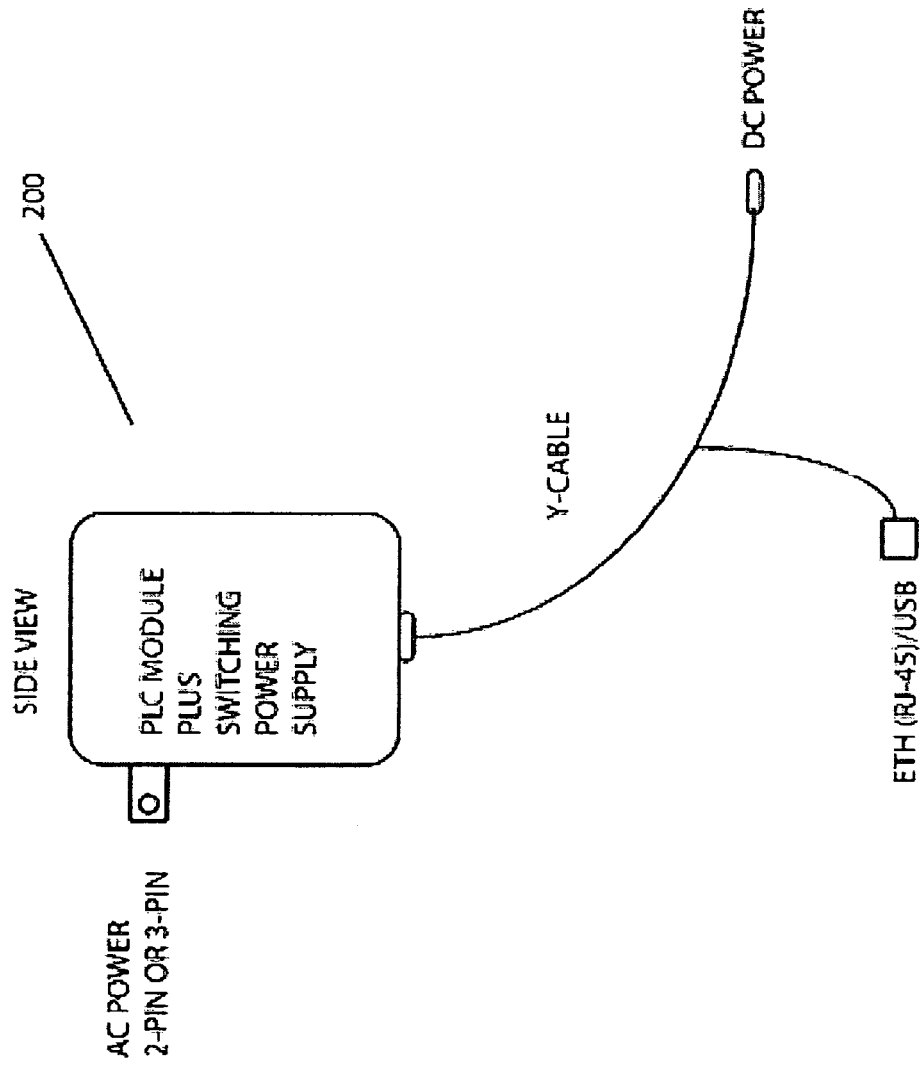
FIG. 2 is a simplified block diagram of an alternative powerline connector according to an alternative embodiment of the present invention.

FIG. 2 is a simplified block diagram of an alternative powerline connector 200 according to an alternative embodiment of the present invention. This diagram is merely an example, which should not unduly limit the scope of the claims herein. One of ordinary skill in the art would recognize other variations, modifications, and alternatives. As shown, an alternative connector 200 is provided. The connector includes a single AC connector, which has at least a first prong and a second prong (which will be plugged into a conventional connector device). The first prong and second prong protrude directly from a hardware module. Alternatively, three prongs or the like can also protrude from the hardware module. Such module including prongs is plugged directly into an AC wall socket including powerline networking capabilities. The hardware module is often made of a durable plastic material, which is moisture resistant. The durable plastic material is rigid and has a dimension of no greater than 6 in length, no greater than 2.5 in width, and no greater than 1¼ in thickness, although other suitable dimensions may also be used. Of course, one of ordinary skill in the art would recognize many other variations, modifications, and alternatives.

In a specific embodiment, the hardware module is coupled to the first pair of wires (which is within the hardware module), which are adapted to transmit a plurality of AC signals corresponding to AC power from the AC connector and a plurality data signals from the AC connector. In a specific embodiment, the first prong and the second prong can be any suitable electrical connections for home, office, or business use. As merely an example, such prongs are often called flatpins, but can also include other variations. As an alternative example, depending upon the particular country, the prongs can also be round and the like. Of course, one of ordinary skill in the art would recognize many variations, alternatives, and variations.

In a specific embodiment of use in the United States of America, the wires are often 12 or 14 gauge each. Although other gauges such as 16 and at least 18 may also be used. The length of such wires is also about 4 ft and often no greater than about 6 ft depending upon the embodiment.

In a specific embodiment, other wires, which include DC and networking wires, extend from the hardware module, which will be described in more detail below. The DC wires is often 18 AWG. The networking wires is often 24 AWG, although others can also be used. In a preferred embodiment, the wires, including network and DC, are bundled together and extend out in the "Y-shaped" configuration, which is illustrated by FIG. 2. As merely an example, the network connector can be any suitable type such as Ethernet (Cat 5) (RF-45), Universal Serial Bus, commonly called USB, mini-USB, or others. As shown, the DC connection is provided to the portable computing device and the network connector is also provided to the portable computing device, which is the same computing device, according to a specific embodiment. Additionally, the hardware module may be decoupled from the AC connector using a plug design and the single network connector and single DC connector can also be decoupled from the hardware module using a plug design. Such plug design may be of a "male" and "female" design or the like. Powerline includes powerline communication signals and power to supply energy to the computing device according to a specific embodiment.

Figure 3:
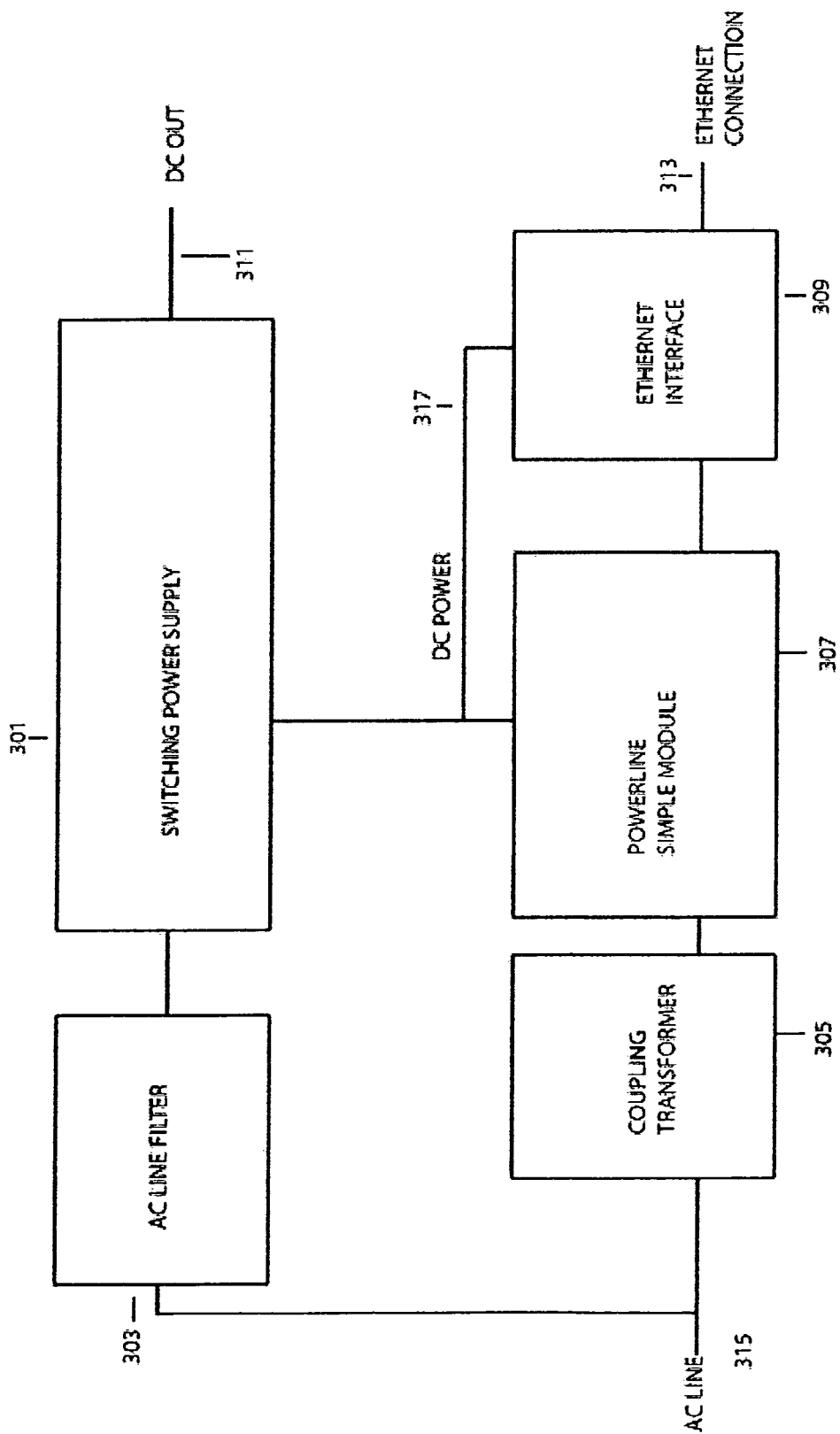
FIG. 3 is a more detailed block diagram of a power line connector according to an embodiment of the present invention.

FIG. 3 is a more detailed block diagram of a power line connector 300 according to an embodiment of the present invention. This diagram is merely an example, which should not unduly limit the scope of the claims herein. One of ordinary skill in the art would recognize other variations, modifications, and alternatives. As shown, the hardware module 300 comprises a switching power supply 301, which is coupled between the single AC connector 315 and single DC connector 311. The switching power supply is adapted to convert AC signals from the single AC connector into direct current for use at the DC connector.

In certain embodiments, filters 303 such as a high frequency isolation filter will be used to block out noise from the power supply. An example of such a filter is inductor although other suitable device can also be used. The power supply may also be shielded to block out any unwanted noise from it to other components described herein. Depending upon the embodiment, shielding can occur using metal shield. Of course, one of ordinary skill in the art would recognize many variations, modifications, and alternatives.

The module also has a powerline module 307 coupled between the single AC connector and single network connection 313. The powerline module is adapted to convert the plurality of data signals in a first format to a plurality of data signals in a second format for use at the single network connection. One of the data signals can be OFDM, which relates to orthogonal frequency division multiplexed signals or like signals, depending upon the application. As merely an example, the power line module is described in more detail in Power Line Enabled Power Supply Module filed as U.S. Application Serial No. (Attorney Docket Number 21917-000110US) commonly assigned and hereby incorporated by reference for all purposes. Other types of modules can also be used depending upon the application.

Preferably, the powerline module is coupled to a coupling transformer 305 between the AC connector and the powerline module. As merely an example, the coupling transformer is ferrite core, although other suitable devices can also be used. The powerline module is coupled to an Ethernet interface (e.g., CAT 5) 309 between the single network connection and the powerline module. In a preferred embodiment, the power line module and Ethernet interface communicate via M11 interface format. Of course, there can be other variations, modifications, and alternatives.

In a specific embodiment, the portable connector is characterized by a total length of less than three feet from the single AC connector to either then single DC connector or the single network connector. The second pair of wires and the network cable are used in a Y-shaped harness between the hardware module and single DC connector and single network connector. Depending upon the embodiment, there can be other variations, modifications, and alternatives.

Figure 4:
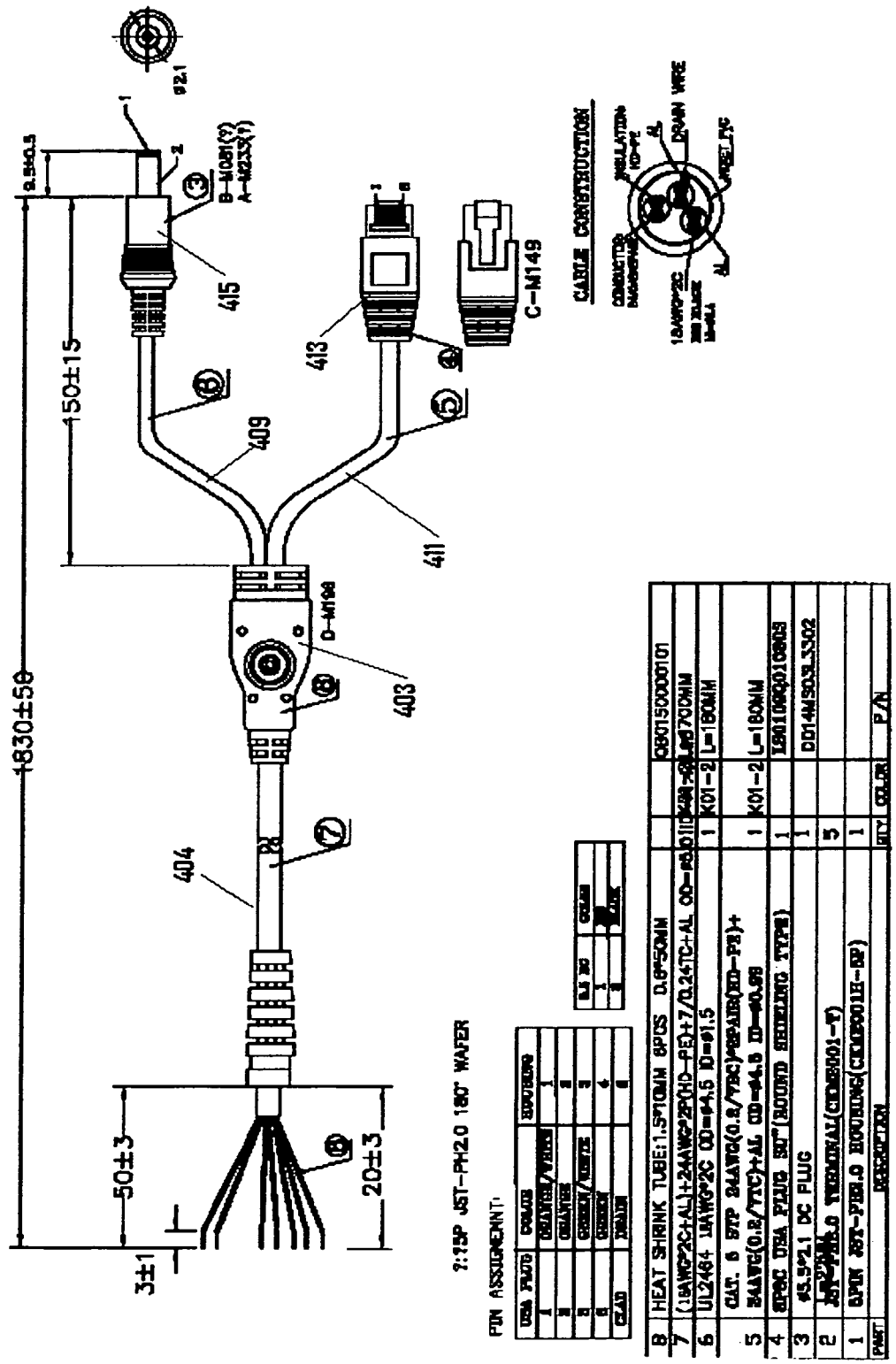
FIG. 4 is a top-view diagram of a power line connector according to an embodiment of the present invention.

FIG. 4 is a top-view diagram of a power line connector 400 according to an embodiment of the present invention. This diagram is merely an example, which should not unduly limit the scope of the claims herein. One of ordinary skill in the art would recognize many variations, alternatives, and modifications. As shown, the connector may include heat shrink tubing 403, which couples DC wiring 409 and network wiring (e.g., Ethernet) 411. The DC wiring includes DC plug 415. The network wiring includes CAT 5 connector 413. Combined wiring is provided through insulating material 404, which is often high density polyethylene or other suitable material. The wiring (which forms the Y-shape) couples into the PLC module plus the switching power supply, which was previously discussed, although not limited to such module and supply. AC power pins extend from the PLC module and switching power supply according to a preferred embodiment.

In a specific embodiment, the AC power lines connect to standard wall outlets, which have been network enabled. The standard three prong outlet is a 5-15R, where the "R" stands for receptacle. The "15" means that it is rated at 15 Amps and 125 Volts. The standard plug for the 5-15R is the 5-15P. The "P" stands for Plug. Alternatively, a 20 amp version has a sideways "T" on one side. This is used to accept a plug with one blade turned sideways, or the standard 5-15P. The designation for this outlet is the 5-20R.

The plug would, of course be the 5-20P. This designates an outlet rated at 20 Amps and 125 Volts. An outlet that looks just like the above outlet is the 6-20R. This is the same 20 Amps but is rated at 250 Volts. Of course, there may be other variations, modifications, and alternatives.

In a specific embodiment, the DC connector is often termed "Barrel" connectors. Such connectors are often designated by the size of the center pin in millimeters, e.g., 1.7 mm DC Power plug. Of course, there can be other variations, modifications, and alternatives.

A method for using a portable connector for power line networking in remote applications may be described below.

1. Couple a single AC connector, which includes at least a first prong and a second prong, into a powerline enabled socket, which includes at least a first receptacle and a second receptacle, the first receptacle being coupled to the first prong and the second receptacle being coupled to the second prong;

2. Transfer at least a plurality of AC signals and a plurality of data signals from the single AC connector through at least a first pair of wires coupled to the single AC connector (Optionally, the AC connector may be coupled directly to the hardware module according to certain embodiments);

3. Transfer the plurality of AC signals and the plurality of data signals to a hardware module coupled to the first pair of wires;

4. Converting the plurality of AC signals into a DC signal;

5. Transfer the DC signal from the hardware module to a single DC connector coupled to the hardware module;

6. Transfer a plurality of communication signals associated with the plurality of data signals from the hardware module to a single network connector coupled to the hardware module;

7. Coupling the single network connector and the single DC connector to a remote application;

8. Use remote application coupled to the DC power signal and network connection; and 9. Perform other steps, as desired.

Figure 5:
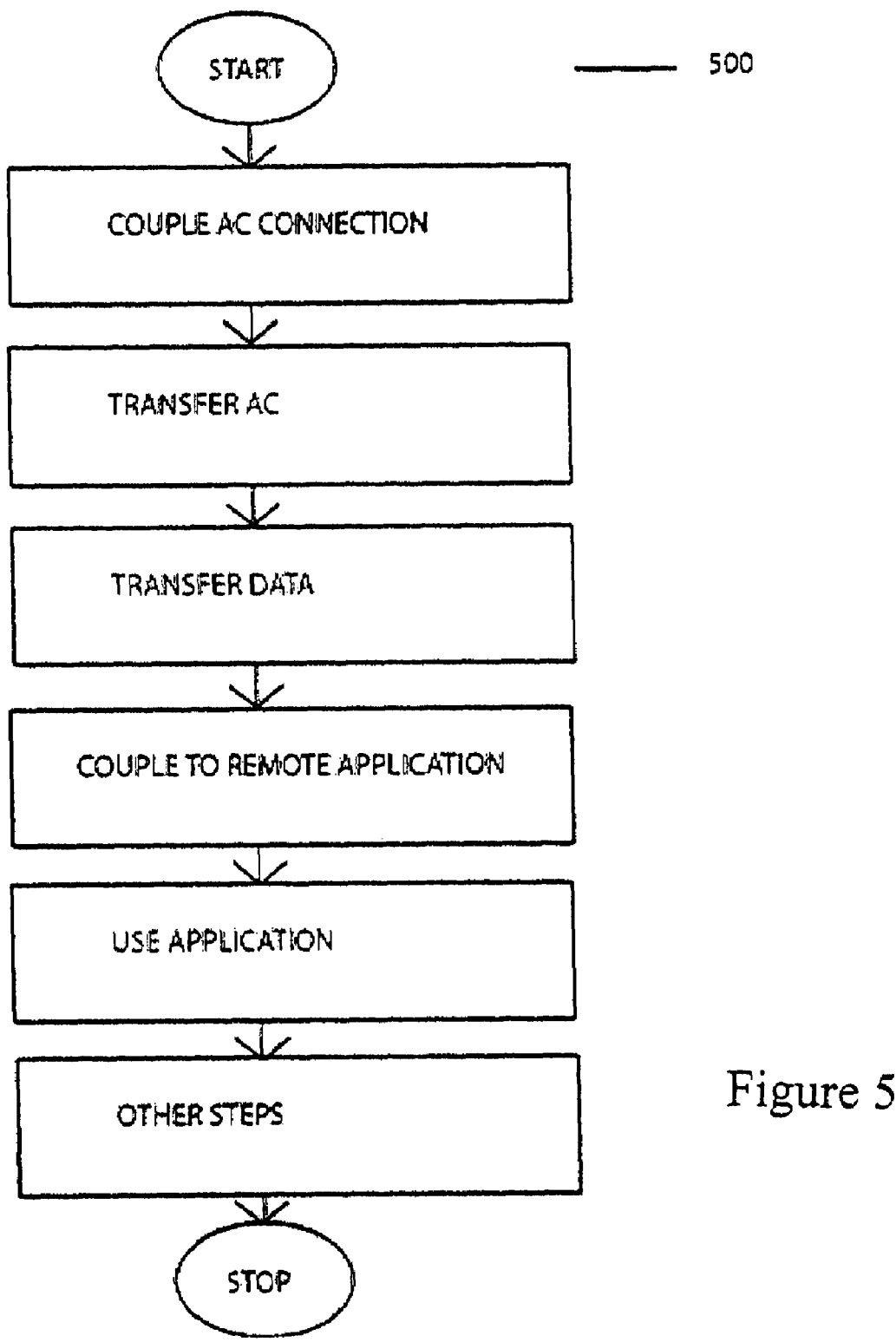
FIG. 5 is a simplified flow diagram of a method of using the powerline connector according to an embodiment of the present invention.

As shown, the present invention provides an easy way of connecting a portable application into both DC and networking capabilities using the present connector device according to a specific embodiment. Depending upon the embodiment, certain steps may be combined. Other steps may be added or taken out of order, as well as other variations without departing from the scope of the claims herein. The method can be implemented using an apparatus such as the one noted above, but can also vary, depending upon the embodiment. A simplified diagram illustrating the method 500 above can be found in FIG. 5, which has been provided for easy referencing.

It is also understood that the examples and embodiments described herein are for illustrative purposes only and that various modifications or change in light thereof will be suggested to persons skilled in the art and are to be included within the spirit and purview of this application and scope of the appended claims.

What is claimed is:

1. A method for using a portable connector for power line networking in remote applications, the portable connector including a housing, the portable connector including a single AC connector comprising a first prong and a second prong, the first prong and the second prong being coupled to a first pair of wires, the first pair of wires including a first wire coupled to the first prong and a second wire coupled to the second prong, the pair of wires being housed within an insulating material, the portable connector including a hardware module coupled to the first pair of wires, the hardware module being positioned within the housing, the portable connector including a networking wire and a DC wire, a first portion of the networking wire and the DC wire being bundled together with a heat shrink tube and extending out from the housing and further being separated in a Y-shaped configuration, the Y shaped configuration including a single network connector and a single DC connector, a second portion of the networking wire being connected to the single network connector, a second portion of the DC wire being connected to the single DC connector, the port connector including powerline module being adapted to convert a plurality of data signals from an OFDM format into a second format, the powerline module being positioned within the housing, the method comprising:

coupling the single AC connector, into a powerline enabled socket, the socket including at least a first receptacle and a second receptacle, the first receptacle being coupled to the first prong and the second receptacle being coupled to the second prong;

transferring at least a plurality of AC signals and a plurality of data signals from the single AC connector through at least the first pair of wires coupled to the single AC connector, the first pair of wires including the first wire coupled to the first prong and the second wire coupled to the second prong;

transferring the plurality of AC signals and the plurality of data signals to the hardware module coupled to the first pair of wires;

converting the plurality of AC signals into a DC signal in the hardware module;

transferring the DC signal from the hardware module through the DC wire to the single DC connector coupled to the hardware module;

transferring a plurality of communication signals associated with the plurality of data signals from the hardware module through the single network wire to the single network connector coupled to the hardware module; and coupling the single network connector and the single DC connector to a remote application.

2. The method of claim 1 wherein the remote application is selected from a lap top computer, a digital camera, a MP3 player, or a cellular phone.

3. The method of claim 1 wherein the hardware module is removable from the first pair of wires coupled to the single AC connector using a plug design.

4. The method of claim 1 wherein the DC signal ranges from about 5 volts to about 20 volts.

5. The method of claim 1 wherein the single network connector, the single DC connector, the hardware module, and single AC connector are portable in characteristic to be provided in a hand carry bag.

6. The method of claim 5 wherein the hand carry bag is a pocket.

7. A method for using a portable connector for power line networking in remote applications and capable of being hand carried, the portable connector including a housing, the portable connector including an AC connector comprising at least a first prong and a second prong, the first prong and the second prong being coupled to a first pair of wires housed within an insulating material , the first pair of wires including a first wire coupled to the first prong and a second wire coupled to the second prong, the first pair of wires being coupled to a hardware module, the hardware module and the first pair of wires being positioned inside the housing, the hardware module including a power supply being adapted to convert a plurality of AC signals having a voltage ranging from about 100 to about 240 volts into a DC signal and a powerline module being adapted to convert a plurality of data signals from an OFDM format into a second format, the powerline module being positioned within the housing the hardware module being coupled to a networking wire and a DC wire, a first portion of the networking wire and the DC wire being bundled together with a heat shrink tube and extending out from the hardware module and further being separated in a Y-shaped configuration, the Y shaped configuration including a network connector and a DC connector, the method comprising:

using the portable connector to couple a remote application to the network connector and the DC connector, a second portion of the networking wire being connected to the single network connector, a second portion of the DC wire being connected to the single DC connector.

8. The method of claim 7 wherein the remote application is selected from a lap top computer, a digital camera, a MP3 player, or a cellular phone.

9. The method of claim 7 wherein the network connector, the single DC connector, the hardware module, and single AC connector are portable in characteristic.

10. The method of claim 7 wherein the hardware module is capable of being decoupled from the first pair of wires coupled to the single AC connector using a first plug design and the hardware module is capable of being decoupled from the networking wire and the DC wire bundled together in the Y shaped configuration using a second plug design.

11. The method of claim 7 wherein the DC signal ranges from about 5 volts to about 20 volts.

12. The method of claim 7 wherein the network connector is a CAT 5.

13. The method of claim 7 wherein the network connector is selected from a USB or mini-USB.

14. The method of claim 7 further comprising shielding the power supply to block out any unwanted noise.

15. The method of claim 7 wherein the power supply is a switching power supply.

\* \* \* \* \*